(12) United States Patent
Pendergrass et al.

(10) Patent No.: US 7,931,552 B2
(45) Date of Patent: Apr. 26, 2011

(54) PULLEY WITH TORQUE-SENSITIVE CLUTCHING

(75) Inventors: Jeff Pendergrass, Dade County, MO (US); Anthony E. Lannutti, Fayetteville, AR (US)

(73) Assignee: Dayco Products, LLC, Tulsa, OK (US)

(*) Notice: Subject to any disclaimer, the term of this patent is extended or adjusted under 35 U.S.C. 154(b) by 428 days.

(21) Appl. No.: 12/112,393

(22) Filed: Apr. 30, 2008

(65) Prior Publication Data

US 2009/0272618 A1    Nov. 5, 2009

(51) Int. Cl.
*F16H 9/00* (2006.01)

(52) U.S. Cl. ............ 474/74; 474/70; 474/73; 474/84; 192/113.32

(58) Field of Classification Search ............ 474/73, 474/74, 32, 35, 84, 86, 70; 192/45, 110 B, 192/113.32, 41 S, 113.34
See application file for complete search history.

(56) References Cited

U.S. PATENT DOCUMENTS

| | | | |
|---|---|---|---|
| 4,509,933 A | 4/1985 | Miranti, Jr. et al. | |
| 4,583,962 A | 4/1986 | Bytzek et al. | |
| 4,596,538 A | 6/1986 | Henderson | |
| 4,662,861 A * | 5/1987 | Seung et al. | 474/86 |
| 4,698,049 A | 10/1987 | Bytzek et al. | |
| 4,822,322 A | 4/1989 | Martin | |
| 4,832,665 A | 5/1989 | Kadota et al. | |
| 4,869,353 A | 9/1989 | Ohtsuki et al. | |
| 4,971,589 A | 11/1990 | Sidwell et al. | |
| 5,015,217 A | 5/1991 | Henderson | |
| 5,035,679 A | 7/1991 | Green et al. | |
| 5,057,059 A | 10/1991 | Sidwell et al. | |
| 5,149,306 A | 9/1992 | Sidwell et al. | |
| 5,209,705 A | 5/1993 | Gregg | |
| 5,215,504 A | 6/1993 | Wong et al. | |
| 5,250,009 A | 10/1993 | Sidwell et al. | |
| 5,370,585 A | 12/1994 | Thomey et al. | |

(Continued)

FOREIGN PATENT DOCUMENTS

EP    1277989 A2    2/2003

(Continued)

OTHER PUBLICATIONS

PCT, International Search Report and Written Opinion, International Application No. PCT/US2009/041573, 10 pages (Jun. 11, 2009).

(Continued)

*Primary Examiner* — Emmanuel M Marcelo
(74) *Attorney, Agent, or Firm* — Thompson Hine LLP

(57) ABSTRACT

A pulley assembly for use in an automobile accessory drive system includes a shaft engaging member including a bore for receiving an accessory input shaft for engagement therewith. A pulley member includes a bore receiving an axially extending shaft of the shaft engaging member. The pulley member includes a first coupling surface and a peripheral belt-engaging surface. A shaft extension member transfers torque between the pulley member and the shaft engaging member. The shaft extension member includes a second coupling surface facing the first coupling surface. The first and second coupling surfaces couple together when torque applied to the shaft extension member is in a first direction such that the shaft extension member and the shaft engaging member rotate with the pulley member. The first and second coupling surfaces decouple when torque applied to the shaft extension member is in a second direction opposite the first direction such that the shaft engaging member rotates relative to the pulley member.

17 Claims, 4 Drawing Sheets

U.S. PATENT DOCUMENTS

| | | | |
|---|---|---|---|
| 5,382,198 A | 1/1995 | Janne | |
| 5,478,285 A | 12/1995 | Bakker et al. | |
| 5,558,370 A | 9/1996 | Behr | |
| 5,575,727 A | 11/1996 | Gardner et al. | |
| 5,598,913 A | 2/1997 | Monahan et al. | |
| 5,620,385 A | 4/1997 | Cascionale et al. | |
| 5,772,549 A | 6/1998 | Berndt et al. | |
| 5,795,257 A | 8/1998 | Giese et al. | |
| 5,803,850 A | 9/1998 | Hong et al. | |
| 5,827,143 A * | 10/1998 | Monahan et al. | 474/73 |
| 6,004,235 A | 12/1999 | Ohta et al. | |
| 6,044,943 A | 4/2000 | Bytzek et al. | |
| 6,083,130 A | 7/2000 | Mevissen et al. | |
| 6,193,040 B1 | 2/2001 | Cerny | |
| 6,217,470 B1 | 4/2001 | Quintus | |
| 6,231,465 B1 | 5/2001 | Quintus | |
| 6,264,578 B1 | 7/2001 | Ayukawa | |
| 6,375,588 B1 | 4/2002 | Frankowski et al. | |
| 6,394,247 B1 * | 5/2002 | Monahan et al. | 192/41 S |
| 6,394,248 B1 * | 5/2002 | Monahan et al. | 192/41 S |
| 6,422,962 B1 | 7/2002 | Lehtovaara et al. | |
| 6,478,118 B2 | 11/2002 | Astrom et al. | |
| 6,554,318 B2 | 4/2003 | Kohut et al. | |
| 6,571,924 B2 * | 6/2003 | Murata et al. | 192/45 |
| 6,582,332 B2 | 6/2003 | Serkh | |
| 6,588,560 B1 * | 7/2003 | Fujiwara | 192/45 |
| 6,592,482 B2 | 7/2003 | Serkh | |
| 6,637,570 B2 * | 10/2003 | Miller et al. | 192/41 S |
| 6,652,401 B2 | 11/2003 | Liu | |
| 6,834,631 B1 | 12/2004 | Blackburn et al. | |
| 6,893,368 B2 * | 5/2005 | Fujiwara et al. | 474/70 |
| 7,104,909 B2 | 9/2006 | Asbeck et al. | |
| 7,186,196 B2 | 3/2007 | Quintus | |
| 7,347,309 B2 * | 3/2008 | Wiesneth et al. | 192/45 |
| 7,448,972 B2 * | 11/2008 | Garabello et al. | 474/74 |
| 7,644,814 B2 * | 1/2010 | Beattie | 192/45.1 |
| 2003/0008739 A1 | 1/2003 | Asbeck et al. | |
| 2003/0098215 A1 * | 5/2003 | Miller et al. | 192/41 S |
| 2004/0112700 A1 * | 6/2004 | Liston et al. | 192/41 S |
| 2010/0147646 A1 * | 6/2010 | Lannutti et al. | 192/41 S |

FOREIGN PATENT DOCUMENTS

| | | |
|---|---|---|
| JP | 02089838 | 3/1990 |
| JP | 02102956 | 4/1990 |
| JP | 05272606 | 10/1993 |
| WO | 2004109247 A2 | 12/2004 |

OTHER PUBLICATIONS

PCT, International Preliminary Report on Patentability, International Application No. PCT/US2009/041573 (Oct. 20, 2010).

* cited by examiner

US 7,931,552 B2

PULLEY WITH TORQUE-SENSITIVE CLUTCHING

TECHNICAL FIELD

The present application relates generally to pulleys and more particularly to a pulley assembly that utilizes torque-sensitive clutching.

BACKGROUND

It is known to drive various automobile accessory assemblies, for example a water pump, generator, fan for cooling coolant, power steering pump, and compressor, using the vehicle engine. This is done by a driving pulley actuated by an engine shaft of the motor vehicle which drives an endless drive belt operating the accessory assemblies through driven pulleys.

Periodic torque pulses, for example, as may be initiated by combustion engine firing can create significant speed transitions which can interrupt smooth operation of the driven components. There may also be inertial and driven speed transitions associated with startup, shutdown, jake braking, gear shifting, etc. These transitions can result in undesirable effects such as belt jump, belt wear, bearing wear, noise, etc.

SUMMARY

In an aspect, a pulley assembly for use in an automobile accessory drive system includes a shaft engaging member including a bore for receiving an accessory input shaft for engagement therewith. A pulley member includes a bore receiving an axially extending shaft of the shaft engaging member. The pulley member includes a first coupling surface and a peripheral belt-engaging surface. A shaft extension member transfers torque between the pulley member and the shaft engaging member. The shaft extension member includes a second coupling surface facing the first coupling surface. The first and second coupling surfaces couple together when torque applied to the shaft extension member is in a first direction such that the shaft extension member and the shaft engaging member rotate with the pulley member. The first and second coupling surfaces decouple when torque applied to the shaft extension member is in a second direction opposite the first direction such that the shaft engaging member rotates relative to the pulley member.

In another aspect, a method of driving an automobile accessory of an automobile accessory drive system is provided. The method includes connecting a pulley assembly to an input shaft of the accessory. The pulley assembly includes a shaft engaging member including a bore for receiving the input shaft for engagement therewith. A belt engaging surface of a pulley member of the pulley assembly is engaged with a drive belt of the automobile accessory drive system, the pulley member including a first coupling surface. Torque is transferred between the pulley member and the shaft engaging member using a shaft extension member. The shaft extension member includes a second coupling surface facing the first coupling surface. The first and second coupling surfaces couple together when torque applied to the shaft extension member is in a first direction such that the shaft extension member and the shaft engaging member rotate with the pulley member. The first and second coupling surfaces decouple when torque applied to the shaft extension member is in a second direction opposite the first direction such that the shaft engaging member rotates relative to the pulley member.

Other advantages and features of the invention will be apparent from the following description of particular embodiments and from the claims.

DETAILED DESCRIPTION

Figure 1:
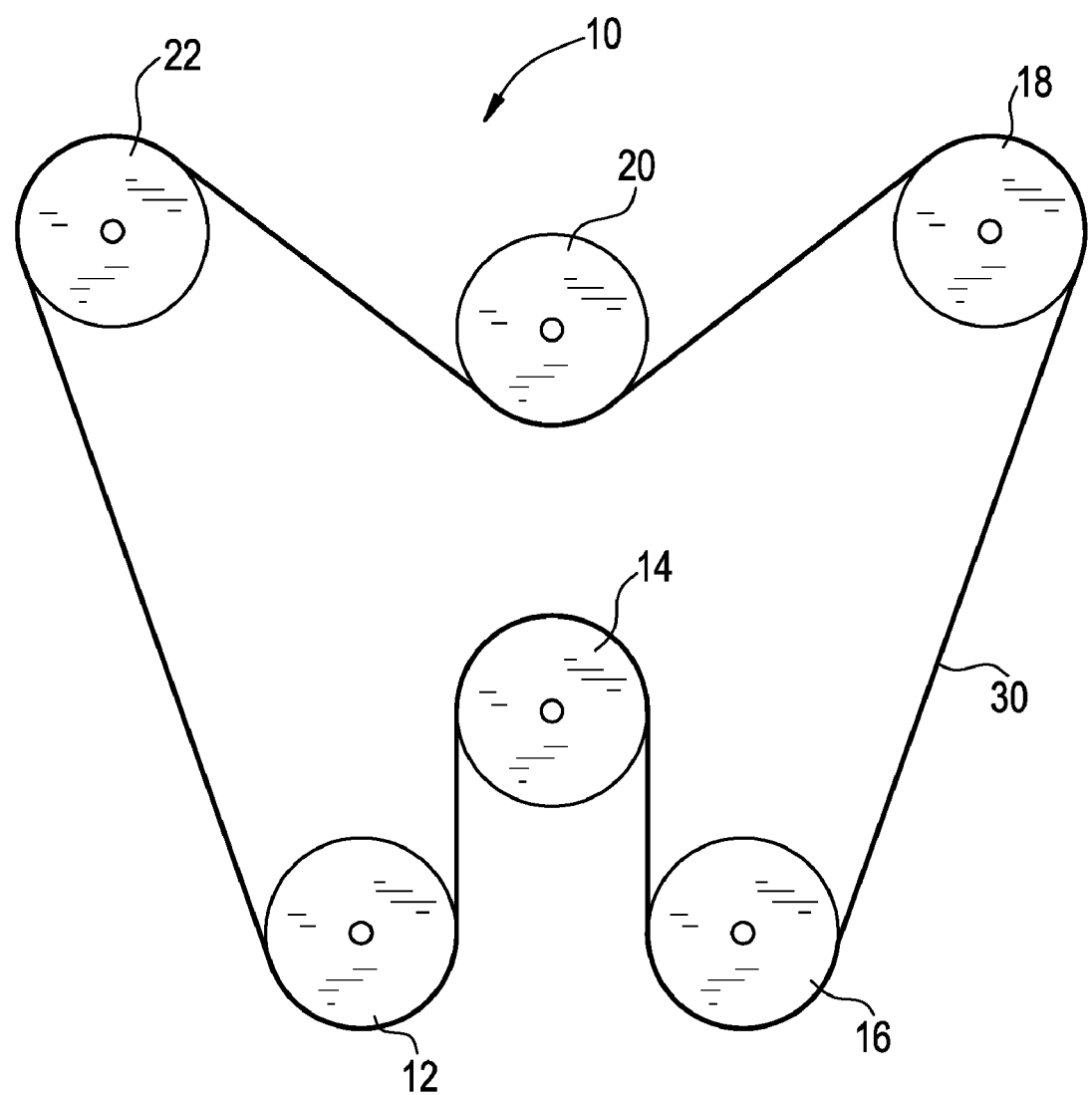
FIG. 1 is a diagrammatic view of an embodiment of an accessory drive system.

Referring to FIG. 1, an accessory drive system 10 of, for example, an internal combustion engine includes an endless belt 30 that is used to drive a number of accessories. The various accessories are represented in FIG. 1 diagrammatically by their pulley assemblies. The belt 30 is entrained around a crank pulley assembly 12, a fan/water pump pulley assembly 14, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of pulley assemblies 14, 16, 18, 20 and 22 that are themselves rotated by the belt 30. For purposes of description, pulley assembly 16 of an alternator will be focused on below. It should be noted, however, that the other pulley assemblies of one or more of the other accessories may also operate in a fashion similar to that of pulley assembly 16.

Figure 2:
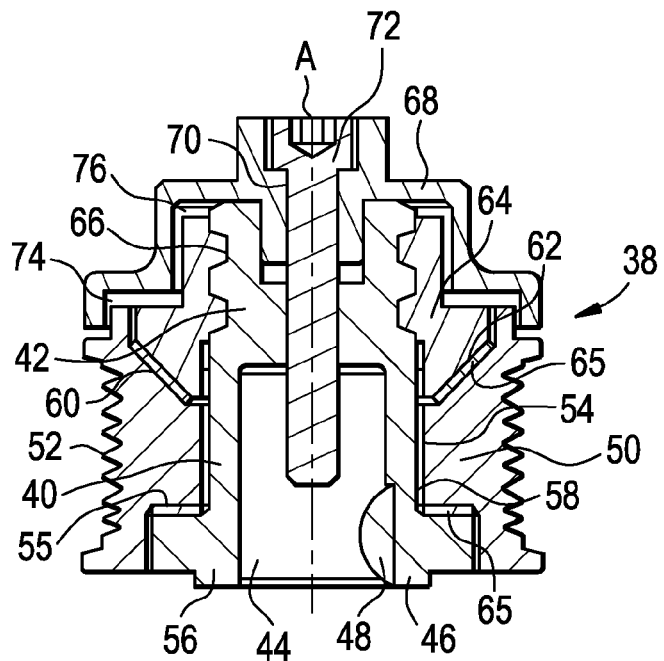
FIG. 2 is a side, section view of an embodiment of a pulley assembly for use in the accessory drive system of FIG. 1.
Figure 4:
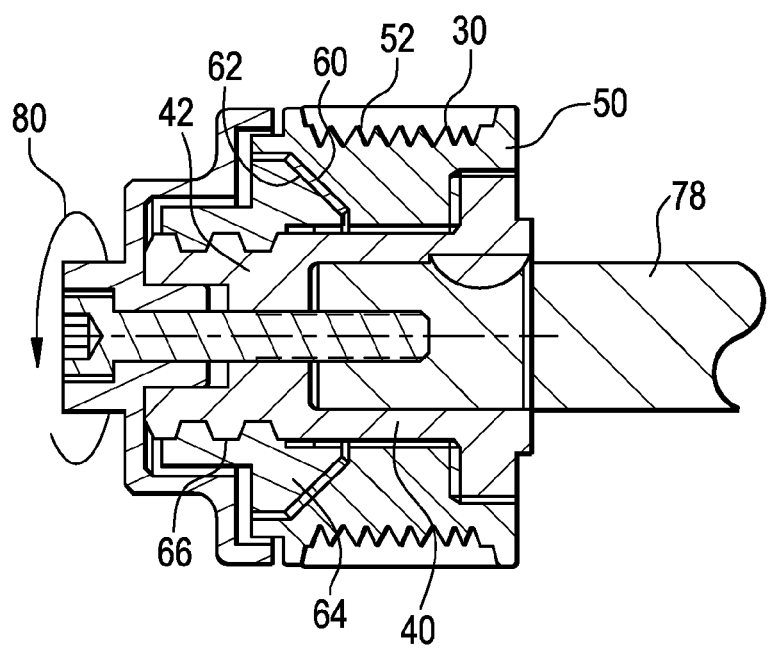
FIG. 4 is a side, section view of the pulley assembly of FIG. 2 connected to an input shaft of an alternator.
Figure 3:
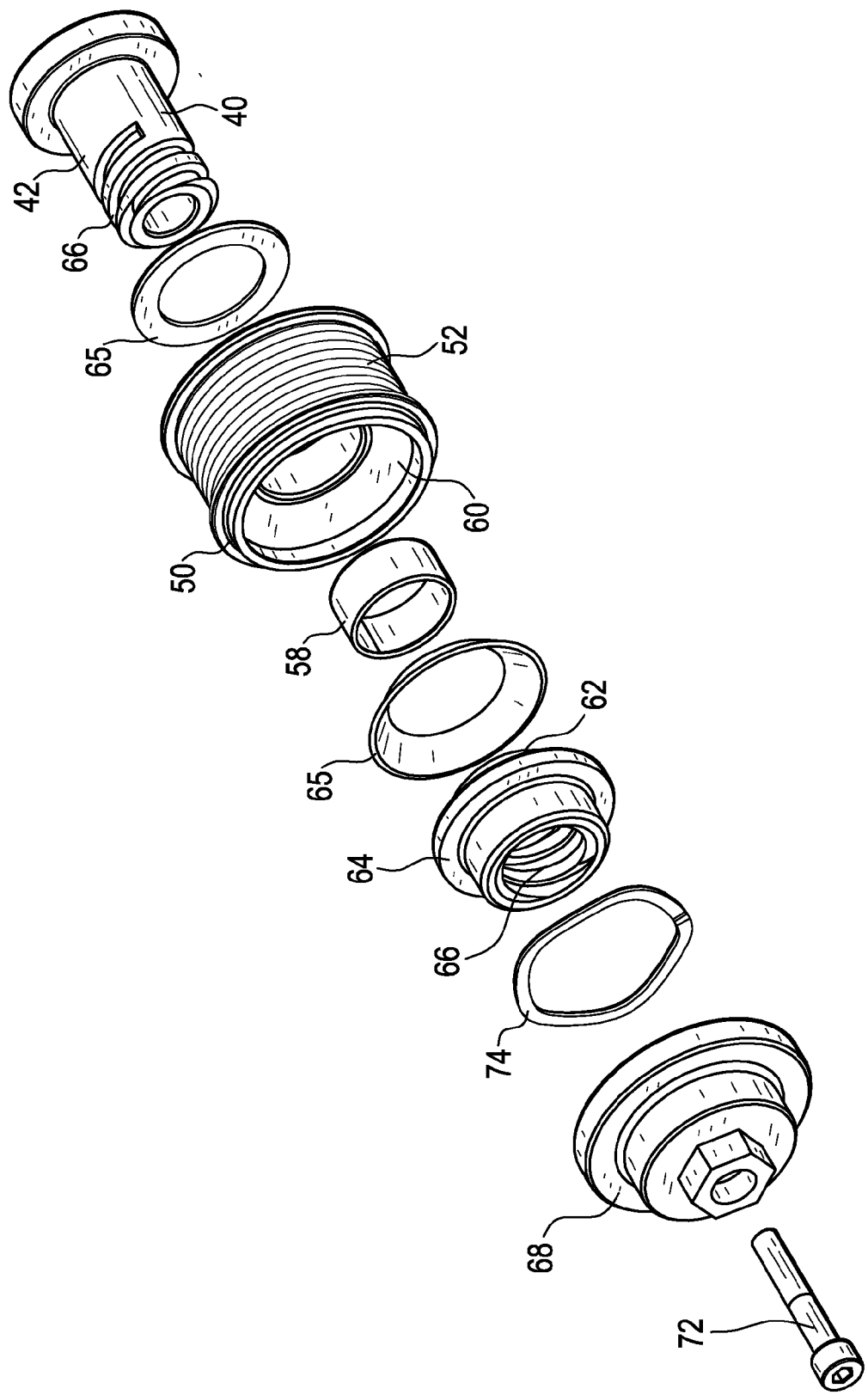
FIG. 3 is an exploded, perspective view of the pulley assembly of FIG. 2

Referring now to FIGS. 2 and 3, pulley assembly 16 operates to control transfer of input torque to the input shaft of the alternator based, in part, on relative reversals in rotation (from a predominate operational rotation) between the pulley assembly and the input shaft 78 of the alternator (FIG. 4). When such relative reversals in rotation between the pulley assembly 16 and the input shaft of the alternator occur, an internal clutching system (generally designated as element 38) of the pulley assembly 16 acts to disengage the alternator from the speed reversal, while permitting the alternator input shaft to rotate with momentum in the predominate operational direction.

The pulley assembly 16 includes a shaft engaging member 40 including an axially-extending shaft 42 with a bore 44 extending inwardly from an outer surface 46 of the shaft engaging member for receiving the input shaft of the alternator. In the illustrated embodiment, the shaft engaging member 40 includes a Woodruff key 48 that mates with a matching slot on the input shaft of the alternator thus preventing the shaft engaging member 40 from freely rotating about the input shaft. Other connections between the shaft engaging member 40 and the input shaft of the alternator are possible.

A pulley member 50 is located about the shaft 42. The pulley member 50 includes a belt-engaging surface 52 that engages belt 30, an opening 54 through which the shaft 42 is received and a recess 55 that receives a flange 56 extending outwardly from the shaft 42. In the illustrated embodiment, the belt engaging surface 52 is profiled including V-shaped ribs and grooves to mate with corresponding ribs and grooves on the belt 30. Other configurations are possible, such as rounded ribs and grooves. The opening 54 is sized such that the pulley member 50 can rotate freely about the shaft 42 of the shaft engaging member. In some embodiments, a bearing material such as a sleeve 58 (e.g., an oil impregnated sintered bronze bearing or NORGLIDE® "T" style bearing with PTFE liner on metal shell) may be located within a gap between the shaft 42 and the pulley member 50.

The pulley member 50 includes a coupling surface illustrated as ramp surface 60 that faces a cooperating coupling or ramp surface 62 of a shaft extension member 64. By "ramp surface," we mean that the surfaces 60 and 62 extend at an angle other than perpendicular (e.g., less than 90 degrees) to the rotational axis A of the pulley assembly 16. The shaft extension member 64 is threadably connected to the shaft engaging member 40 via helical threading 66. A friction material 65 may be located between the ramp surfaces 60 and 62. The friction material may be a non-asbestos molded material with medium to high friction, good stability and good wear characteristics, such as GL 121-110 or GL 181-142 commercially available from Great Lakes Friction Product, Inc. Milwaukee, Wis. Friction material 65 may also be located between the pulley member 50 and the flange 56.

A cover plate 68 is located at a side of the shaft engaging member 40 opposite the outer surface 46. The cover plate 68 includes an opening 70 through which a fastener 72 extends and threadably connected to the shaft engaging member thereby capturing the pulley member 50 between the shaft extension member 64 and the flange 56 that extends outwardly from the shaft 42.

In some embodiments, a spring, such as a wave spring 74 is located within a gap between the cover plate 68 and the shaft extension member 64. The wave spring 74 applies an engagement force to the shaft extension member 64 that urges the ramp surface 62 of the shaft extension member 64 toward the ramp surface 60 of the pulley member 50. The wave spring 74 also inhibits the shaft extension member 64 from locking up against the cover plate 68 during rapid transitions of rotational speed. In some instances, the wave spring 74 can also reduce belt noise during engine startup through application of the engagement force to the shaft extension member 64.

As can be seen in FIG. 2, there is room for some axial movement of the shaft extension member 64, between the pulley member 50 and the cover plate 68 (e.g., see gap 76). This room between the pulley member 50 and cover plate 68 allows for coupling and decoupling of the shaft extension member 64 (and shaft engaging member 40) from the pulley member 50, as will be described in greater detail below.

FIG. 4 illustrates the pulley assembly 16 connected to the input shaft 78 of the alternator. Belt 30 is engaged with the belt engaging surface 52 of the pulley member 50. Under normal operation with the belt 30 driving with pulley assembly 16 in the predominate operating direction as indicated by arrow 80, the helical threading 66 between the shaft extension member 64 and the shaft 42 is such that the ramp surface 62 couples with the ramp surface 60 of the pulley member 50 so that the shaft extension member and the shaft engaging member 40 rotate with the pulley member 50. The connection between the shaft engaging member 40 causes the input shaft 78 of the alternator 20 to rotate in order to generate electrical energy.

In some instances, the pulley assembly 16 may experience rapid transitions in rotational speed and even speed reversals, which cause the pulley member 50 to experience a rapid transition in its rotational speed. Because of its momentum, however, the alternator's input shaft 78 tends to want to rotate in the predominant operating direction. During speed reversals of the pulley member 50, the reversal of torque experienced by the shaft extension member 64 causes the shaft extension member to move axially away from the pulley member due to the helical threaded connection 66 between the shaft extension member and the shaft 42. This axial movement of the shaft extension member 64 away from the pulley member 50 decouples the connection therebetween thereby allowing the alternator's input shaft 78 to rotate relative to the pulley member. This decoupling of the connection between the shaft extension member 64 and the pulley member 50 allows the alternator's input shaft 78 (and the shaft engaging member 40 to continue rotating in the predominate operating direction due to the momentum of the alternator's input shaft when the pulley member 50 experiences a speed reversal.

Various parameters can affect operation of the pulley assembly 16 such as thread pitch and quantity of the threads forming the helical threaded connection 66, wave spring force, etc. Additionally, the above-described clutch assembly 38, due to the slip provided between engagement and non-engagement of the ramp surfaces 60 and 62, can provide a relative smooth (non-instantaneous) transition between the coupled and decoupled configurations. By ramping the surfaces 60 and 62, pressure is decreased between the surfaces 20 and 62, which can decrease wear and prolong life. Also, by ramping the surfaces 60 and 62, the force is moved inwardly toward the helical threads thereby reducing thread pressure and allowing the shaft extension member 64 to disengage more freely increasing system responsiveness. The threaded connection 66 provides for increasing contact pressure in the predominant operating direction versus a relatively lightly induced disengagement in the counter-prevailing direction.

Figure 5:
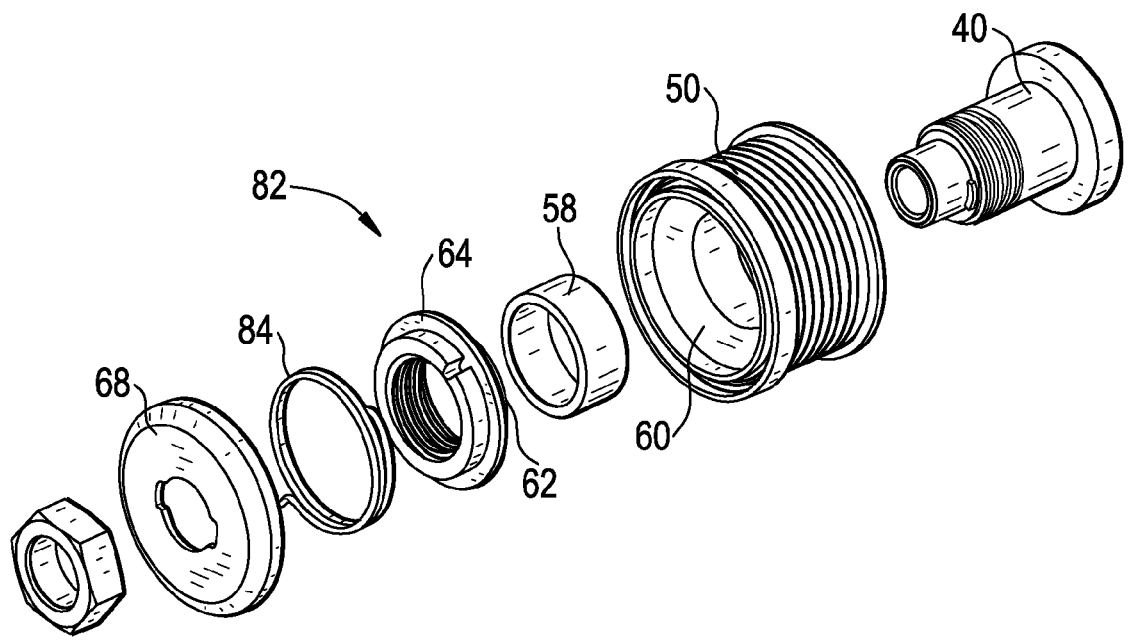
FIG. 5 is an exploded, perspective view of another embodiment of a pulley assembly for use in the accessory drive system of FIG. 1.
Figure 6:
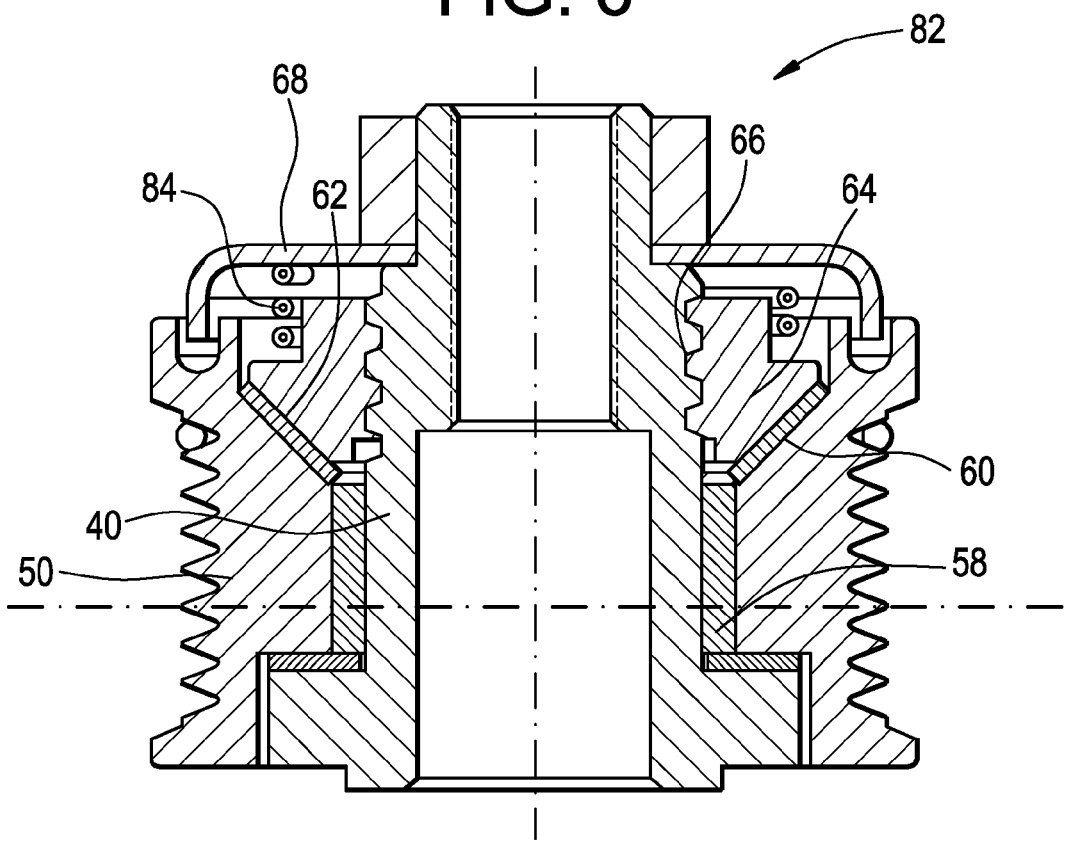
FIG. 6 is a side, section view of the pulley assembly of FIG. 5 in an assembled configuration.

A number of detailed embodiments have been described. Nevertheless, it will be understood that various modifications may be made. For example, referring to FIGS. 5 and 6, another pulley assembly 82 includes many of the components described above. A torsion spring 84 (e.g., a round wire spring) is used to urge the shaft extension member 64 and its ramp surface 62 toward the pulley member 50 and its ramp surface 60. Accordingly, other embodiments are within the scope of the following claims.

What is claimed is:

1. A pulley assembly for use in an automobile accessory drive system, the pulley assembly comprising:
    a shaft engaging member including a bore for receiving an accessory input shaft for engagement therewith;
    a pulley member including a bore receiving an axially extending shaft of the shaft engaging member, the pulley member including a first coupling surface and a peripheral belt-engaging surface; and
    a shaft extension member threadably connected to the shaft engaging member that transfers torque between the pulley member and the shaft engaging member, the shaft extension member including a second coupling surface facing the first coupling surface;
    wherein the first and second coupling surfaces couple together when torque applied to the shaft extension member is in a first direction such that the shaft extension member and the shaft engaging member rotate with the pulley member;
    wherein the first and second coupling surfaces decouple when torque applied to the shaft extension member is in a second direction opposite the first direction such that the shaft engaging member rotates relative to the pulley member.

2. The pulley assembly of claim 1, wherein the shaft extension member includes an opening extending therethrough that includes a threaded inner surface engaging a threaded outer surface of the axially extending shaft of the shaft engaging member such that, with the torque applied to the shaft extension member in the first direction, the second coupling surface moves toward the first coupling surface and with the torque applied to the shaft extension member in the second direction, the second coupling surface moves away from the first coupling surface.

3. The pulley assembly of claim 2, wherein the first coupling surface and the second coupling surface are ramp surfaces, extending at an angle less than 90 degrees to the rotational axis of the pulley assembly.

4. The pulley assembly of claim 2 further comprising a bearing material between the shaft of the shaft engaging member and the pulley member.

5. The pulley assembly of claim 1 further comprising a friction material located between the first and second coupling surfaces.

6. The pulley assembly of claim 1 further comprising a biasing member that urges the second coupling surface toward the first coupling surface.

7. The pulley assembly of claim 6, wherein the biasing member is a wave spring.

8. The pulley assembly of claim 6, wherein the biasing member is a torsion spring.

9. A method of driving an automobile accessory of an automobile accessory drive system, the method comprising:
- connecting a pulley assembly to an input shaft of the accessory, the pulley assembly including a shaft engaging member including a bore for receiving the input shaft for engagement therewith;
- engaging a belt engaging surface of a pulley member of the pulley assembly with a drive belt of the automobile accessory drive system, the pulley member including a first coupling surface;
- threadably connecting the shaft extension member to the shaft engaging member;
- transferring torque between the pulley member and the shaft engaging member using a shaft extension member, the shaft extension member including a second coupling surface facing the first coupling surface, the first and second coupling surfaces coupling together when torque applied to the shaft extension member is in a first direction such that the shaft extension member and the shaft engaging member rotate with the pulley member; and
- decoupling the first and second coupling surfaces when torque applied to the shaft extension member is in a second direction opposite the first direction such that the shaft engaging member rotates relative to the pulley member.

10. The method of claim 9 wherein the shaft extension member including an opening extending therethrough that includes a threaded inner surface engaging a threaded outer surface of the shaft engaging member such that, applying torque to the shaft extension member in the first direction causes the second coupling surface to move toward the first coupling surface and applying torque to the shaft extension member in the second direction causes the second coupling surface to move away from the first coupling surface.

11. The method of claim 10, wherein the first coupling surface and the second coupling surface are ramp surfaces extending at an angle less than 90 degrees to the rotational axis of the pulley assembly.

12. The method of claim 10 further comprising locating a bearing material between the shaft engaging member and the pulley member.

13. The method of claim 9 further comprising locating a friction material between the first and second coupling surfaces.

14. The method of claim 9 further comprising biasing the second coupling surface toward the first coupling surface using a biasing member.

15. The method of claim 14, wherein the biasing member is a wave spring.

16. The method of claim 14, wherein the biasing member is a torsion spring.

17. The method of claim 9, wherein the automobile accessory is an alternator.

* * * * *